United States Patent Office 3,459,648
Patented Aug. 5, 1969

3,459,648
PHOTOLYTIC PRODUCTION OF CYCLOALKYL KETOXIMES
John P. Guarino, Trenton, and Robert H. Williams, Pennington, N.J., assignors to Mobil Oil Corporation, a corporation of New York
No Drawing. Continuation-in-part of application Ser. No. 569,107, Aug. 1, 1966. This application Apr. 3, 1968, Ser. No. 718,365
Int. Cl. C07c 3/24; B01j 1/10
U.S. Cl. 204—162     10 Claims

ABSTRACT OF THE DISCLOSURE

A ketoxime of a cycloalkane is produced by a photochemical reaction between a cycloalkane (cyclohexane) and an alkyl nitrite. The initial product is a nitrosocycloalkane which is isomerized to the ketoxime, either in a separate step or preferably, during the photolytic reaction in the presence of a polar material (alcohol, pyridine, etc.) or at moderately elevated temperatures or both. The cyclohexanone oxime is of value as a precursor for making nylon 6, being converted by the Beckmann rearrangement to epsilon-caprolactam, which yields nylon 6 by self-condensation.

CROSS-REFERENCE TO RELATED APPLICATION

This application is a continuation-in-part of copending application Ser. No. 569,107, filed Aug. 1, 1966, now abandoned.

BACKGROUND OF THE INVENTION

Field of the invention

This invention relates to the production of ketoximes of cycloalkyl compounds in good yield by means of a photochemical reaction between a cycloalkyl compound and an alkyl nitrite. It particularly relates to the production of cyclohexanone oxime.

Description of the prior art

It has been proposed to prepare cyclic ketoximes by reacting nitrosyl chloride with a cycloalkane in the presence of actinic light or ionizing radiation. It has also been proposed to react a cycloalkane with nitric oxide in the presence of gamma radiation. Insofar as is now known photolytic reaction of an alkyl nitrite with cycloalkanes has not been proposed.

In copending application Ser. No. 542,719, filed Apr. 15, 1966, there is disclosed and claimed a process of forming a ketoxime by reacting a cycloalkyl hydrocarbon with an alkyl nitrite while irradiating the reactants with ionizing radiation.

SUMMARY OF THE INVENTION

This invention comprises forming a mixture of a cycloalkane and an alkyl nitrite in which the molar amount of the former exceeds that of the latter, adjusting the temperature and pressure of the mixture so that the reactants are primarily in the liquid phase, exposing the reactants to radiation of a wave length of 1000 to 4000 Angstrom units to form a substantial amount of the nitrosocycloalkane, and rearranging the latter compound to a cycloalkyl ketoxime. In one embodiment, the rearrangement is carried out in situ during the reaction and in the presence of polar material (alcohol, pyridine, etc.) preferably at a slightly elevated temperature. In another embodiment, the rearrangement is carried out in the absence of added material but at a moderately elevated temperature.

DESCRIPTION OF SPECIFIC EMBODIMENTS

The invention contemplates the use of various cycloaliphatic compounds, particularly cycloalkanes having 5 to 12 carbon atoms in the ring portion and including cyclopentane, cyclohexane, cycloheptane, cyclooctane, cyclononane, cyclodecane, cycloundecane, and cyclododecane. The alkyl nitrites include those wherein the alkyl group is ethyl, methyl, propyl isopropyl, butyl, isobutyl, tertiary butyl, amyl, isoamyl, and tertiary amyl. These comprise a well-defined group of lower alkyl nitrites having 1 to 5 carbon atoms in the alkyl radical.

The concentration of the alkyl nitrite is quite low, preferably ranging from 0.001 to 0.01 mole per mole of cycloalkane, although concentrations of nitrite of up to 0.1 mole per mole of cycloalkane are useful.

Photolysis is preferably carried out at 5° to 80° C. and at a pressure sufficient to maintain the reactants in the liquid phase. Somewhat higher and lower temperatures are also desirable, ranging from about 0° to about 125° C. Reaction times generally may extend from 0.1 hour to 10 hours but can be both longer and shorter. The method is suitable for batch or continuous operation, preferably the latter. In continuous operation, as practiced commercially, a very short exposure to highly intense light can be preferable.

Photolysis is preferably carried out with ultraviolet radiation, i.e., radiation whose wave length can vary from 1000 to 2000 to 4000 Angstrom units. In terms of light flux, this may vary from $10^{19}$ to $10^{22}$ photons absorbed per hour per square centimeter of mixture undergoing photolysis. Any suitable source of light can be employed, preferably a photochemical lamp of conventional power and suitably equipped to isolate a desired wave length. Commercially, however, the full output of a high pressure mercury lamp can be the most economical. Fluorescent lamps are useful, and also sunlight. Flash photolysis can be employed, or even a laser beam. Distances between the light source and the reaction mixture are of conventional magnitude, viz, 1 to 10 inches. Air is preferably excluded from the reactants.

Referring to the cyclohexane/methyl nitrite reaction, as illustrative of the process, desired product may be present in the reaction mixture in three forms: monomeric nitrosocyclohexane, dimeric nitrosocyclohexane, and the isomeric cyclohexanone oxime. The nitroso compounds in solution may be converted to the oxime by heating, preferably in the presence of polar substances. This may be done during the photolysis step. On the basis of oxime, yields of product may range up to 60, 80 or even 90 mole percent of the starting alkyl nitrite that is utilized. On a quantum basis, quantum yields of up to 0.9 molecule of oxime per photon absorbed are obtainable. In handling the reaction mixture to recover product, the mixture may be freed of gaseous material, comprising mainly hydrogen, nitrogen, and methyl nitrite, by simply warming the same to room temperature or somewhat above, or if the reaction was carried out at or above room temperature, then by releasing the pressure. It will of course be advantageous to recover these materials, especially the methyl nitrite. Following such separation or recovery, the product if already in the oxime form may be recovered by distillation or other standard separation techniques. If nitrosocyclohexane is present, it can be converted to the oxime by adding to the mixture a catalyst which influences the rearrangement, such as a conventional base or acid. A polar substance such as a low molecular weight alkanol like methanol can also be used, or a low molecular weight organic acid such as an aliphatic carboxylic acid, or water. As will be recognized, methanol is formed in the course of the reaction and can act as a catalyst, although the amount preferably is supplemented. Another suitable catalyst is a base like cyclohexyl amine dissolved in cyclohexane. Bases in solid form, such as sodium carbonate and the like, when finely divided and suspended in the mixture, may act as a catalyst. The nitroso compound is present primarily in the form of its dimer, but in the described conversion, the dimer is changed to the oxime, probably through the monomer.

When a strong acid like sulfuric or hydrochloric is used as the catalyst, it not only acts to rearrange, or isomerize, the nitroso compound to the oxime but also to form an acid salt of the oxime. The acid salt is insoluble in the unchanged cyclohexane and can thus be separated therefrom. If it is wished to convert the oxime to caprolactam, the oxime may be used in the acid salt form. Otherwise, the free oxime may be obtained by neutralizing the solution of the acid salt with a base, as a result of which step the oxime comes out as a solid or, if impurities are present, as an oil, which may then be purified; however, a preferred procedure is to neutralize the solution of the acid salt and then solvent extract this neutral solution to remove the oxime, after which the solvent is removed and the oxime recovered.

In one embodiment of this invention, the isomerization of the nitrosocycloalkane to ketoxime is carried out in situ as the photolytic reaction is proceeding. Nitrosocycloalkane (dimer) absorbs light so strongly that the efficiency of light utilization in the process is lowered drastically as the reaction proceeds and dimer concentration increases. Thus, in this embodiment, certain polar materials, such as a lower alcohol and pyridine, are added to the initial reaction mixture to catalyze the in situ isomerization. An additional advantage is that the amount of alkyl nitrite converted to nitrogen gas is reduced. In this type of operation it is preferred to operate at temperatures above room temperature up to about 100° C.

In another embodiment of this invention, in situ isomerization of the nitrosocycloalkane to ketoxime can be carried out in the absence of polar materials, by operating the photolysis reaction at elevated temperatures. Temperatures in the order of between about 100° C. and about 125° C. are suitable.

The oxime, or its acid salt, can be converted to caprolactam by means of the Beckmann rearrangement, comprising heating the same to about 100° C. to 140° C. in the presence of a strong acid such as 96% sulfuric acid, chlorosulfonic acid, or oleum. The resulting solution of caprolactam is neutralized, as with ammonia, and the crude lactam separates as the upper layer. It is drawn off and purified in several stages, including the use of vacuum distillation, into fiber grade caprolactam suitable for making nylon 6.

EXAMPLE 1

Cyclohexane and methyl nitrite were reacted in a small glass tube as the reaction vessel.

The methyl nitrite had been prepared by ester interchange with pentyl nitrite and purified by removal of entrained methyl alcohol and possible traces of nitric oxide by distillation under appropriate temperature conditions, using vacuum line techniques. To prevent photochemical decomposition, the purified methyl nitrite gas was stored in a bulb from which all light was excluded.

The above-mentioned glass tube comprised, at one end thereof, a cell portion of circular cross section 1 cm. in diameter and 6 cm. in length, and at the other end of the tube there was formed an open-ended ground glass plug which was adapted to be placed in a ground glass receptacle to form a joint. Intermediate the end portions, the tube had a constriction by means of which it could be sealed off. To the cell portion of the tube there were charged 3.84 g. (0.0457 mole) of cyclohexane and 0.0366 g. (0.0006 mole or 600 micromoles) of methyl nitrite. The contents of the cell were degassed by freezing the same in liquid nitrogen and pumping directly on the frozen reactants down to a pressure of less than $5 \times 16^{-6}$ mm.

The tube was then sealed off at this pressure and temperature. Then, the tube was placed in the laboratory in a position accessible to sunlight and on which sunlight did fall, and allowed to remain there at room temperature for a period of 4 weeks. The cell was then opened and the reaction mixture analyzed by means of a spectrophotometer. The analysis showed (1) no methyl nitrite to be present, indicating that it had all been used up, and (2) the presence of 171 micromoles of nitrosocyclohexane. Additional analysis of the reaction mixture by chromatography showed the presence of 220 micromoles of cyclohexanone oxime. Thus, a total of 391 micromoles of these two useful products were found to be produced over the 4-week period which, on the basis of the original concentration of methyl nitrite, amounted to a yield of 64.5%.

EXAMPLE 2

In another run, cyclohexane and methyl nitrite were photolyzed in a glass reaction tube whose cell portion has a square, rather than a round, cross section. In other respects, the tube was substantially like that described in Example 1. The advantage of the square cell was that it could be placed in the spectrophotometer for a spectrum measurement without necessity for breaking the cell and transferring its contents to another vessel. Thus, the square cell enabled the course of the photolysis to be followed spectrophotometrically. The amount of cyclohexane was 3.84 g. (0.0455 mole), and the amount of methyl nitrite was 0.0027 g. (0.0000441 mole or 44.1 micromoles). The mixture was degassed and sealed, and then photolyzed by placing the tube 5 cm. away from an ordinary desk light having two 15-watt fluorescent tubes. The reaction mixture was photolyzed intermittently and the methyl nitrite disappearance after each exposure was measured spectrophotometrically. The nitrosocyclohexane content was also determined at this time, but the amount of oxime, to which the nitroso compound was being slowly converted, could not be determined spectrophotometrically. Thus, the nitroso compound content present at any one time did not measure the extent of the total conversion of nitrite to desired products. After three exposures (Nos. 1, 2 and 3 in Table I), the reaction mixture was stored in the dark (Nos. 4, 5 and 6) for various periods and the same measurements made; thereafter the mixture was again exposed to the desk lamp (Nos. 7, 8, 9 and 10); and finally it was placed in the dark again (No. 11).

TABLE I

| Run No. | Experimental conditions | Methyl nitrite, micromoles present | Nitroso-cyclohexane, micromoles present | Nitroso compound present based on nitrite utilized, percent |
|---|---|---|---|---|
| 0 | Initial composition | 44.1 | 0 | 0 |
| 1 | Desk lamp, 2 hours | 42.2 | 1.2 | 63 |
| 2 | Desk lamp, 1 hour | 41.2 | 2.4 | 83 |
| 3 | Desk lamp, 2 hours | 38.9 | 3.6 | 69 |
| 4 | Storage in dark, 18 hrs | 38.9 | 3.4 | 65 |
| 5 | 50° C. in dark, 3 hours | 38.9 | 2.9 | 56 |
| 6 | Storage in dark, 18 hrs | 38.9 | 2.7 | 52 |
| 7 | Desk lamp, 7 hours | 51.7 | 8.2 | 29 |
| 8 | Desk lamp, 60 hours | 0 | 8.6 | 20 |
| 9 | Desk lamp, 7 hours | 0 | 6.7 | 15 |
| 10 | Desk lamp, 18 hours | 0 | 1.1 | 2.5 |
| 11 | 50° C. in dark, 16 hrs | 0 | 0 | 0 |

These results show that light is necessary for the reaction to take place, as Nos. 4, 5 and 6 clearly show that there is no consumption of nitrite in the dark. It is apparent from Nos. 1, 2 and 3 that there is a substantial conversion of the nitrite utilized to the nitroso compound. Light also causes the nitrosocyclohexane to isomerize or rearrange, as demonstrated (Nos. 9 and 10) by the decreasing amount of nitroso compound, indicative of its conversion to the oxime. Run No. 5 shows that heat in the absence of light does not cause dissociation of methyl nitrite but rather accelerates isomerization of the nitroso compound. A qualitative chromatographic analysis of the final mixture showed only cyclohexanone oxime and methyl alcohol to be present.

EXAMPLE 3

In this experiment, photolysis was carried out with ultraviolet radiation of a wave length of 2537 Angstrom units, and a quantum number was determined for the reaction. The reaction vessel was essentially identical with that used in Example 1 except that the cell portion was of quartz. To the cell portion of the tube there were added 3.82 g. (0.0455 mole) of cyclohexane and 0.0285 g. (0.000467 mole or 467 micromoles) of methyl nitrite. The light source was a Hanovia photochemical lamp, model 88A, of 30 watts power. The photolysis was carried out at ambient temperature (about 25° C.) for 1 hour using a light flux of approximately $5 \times 10^{19}$ photons/hr. Photolysis was then stopped, the cell opened up, and the contents subjected to chromatographic analysis with the following results: 10.2 micromoles of nitrosocyclohexane, and 18.9 micromoles of cyclohexanone oxime were found, for a total of 29.1 micromoles of useful products. Based on the original amount of methyl nitrite (467 micromoles), the yield of useful products after only 1 hour of photolysis was 6.2%. The quantum yield of both of these products was 0.35 molecule per photon absorbed.

EXAMPLES 4 THROUGH 8

The cyclohexane and methyl nitrite in a mole ratio of about 100 to 1 cyclohexane to nitrite (usually 3.84 g. of cyclohexane and 0.0027–0.0028 g. of methyl nitrite, the latter being measured by volume in the gas phase) were sealed in a glass reactor in the absence of air. A series of runs were carried out, as shown in Table II. In some runs, a polar compound was added to the starting reaction mixture.

When additives were used, they were previously dissolved in the cyclohexane and the amount of methyl nitrite adjusted accordingly. Pyridine was employed at 12.3 wt. percent and methyl alcohol at 9.0%. The solutions were irradiated with a General Electric 40 watt "Black Light" lamp. The glass reactor was basically a spectrophotometric cell and thus the initial concentration of the methyl nitrite and its disappearance during the reaction could be determined by UV spectrophotometry. Also, the appearance of the nitrosocyclohexane dimer and its final concentration could also be noted. At the end of the reaction, the cell was opened under vacuum and the evolved gas measured. The gas was analyzed by mass spectroscopy and found to be essentially all nitrogen. The solution was analyzed by gas chromatography for cyclohexanone oxime. The "dimer" concentration was determined again on a diluted sample at the absorption maximum.

higher temperature, the product is essentially all oxime.

It is advantageous to convert the dimer to oxime as soon as formed, since "dimer" is a very strong absorber of activating light and its presence in the reaction mixture decreases the efficiency of light utilization. Cyclohexanone oxime does not absorb the activating light. Performing the dimer to oxime conversion during the photonitrosation step also reduces by one the total number of steps in the process. Decreasing the nitrogen gas conversion increases the yield of more valuable organic by-products.

EXAMPLE 9

A quartz square tube reactor was filled with 3.84 g. of cyclohexane and 0.0283 g. of methyl nitrite and exposed directly to the light output of a 450 watt Hanovia high pressure mercury lamp. Total exposure was for 40 minutes, divided into four ten minute cycles wherein the heat from the light source was allowed to bring the temperature from ambient to a value estimated at 125° C. After the methyl nitrite was used up, as determined from the UV spectra determined after each cycle, analysis of the reactor contents showed no nitrosocyclohexane dimer present. A 44% yield of cyclohexanone oxime was obtained based on methyl nitrite.

This example demonstrates the feasibility of using the wide range light output of a lamp similar to the type used commercially. Furthermore, it demonstrates that by using the heat output of the lamp to heat the sample, it is possible to isomerize the dimer in situ without adding a supplemental isomerization agent.

EXAMPLE 10

A similar experiment was done using 3.88 g. of cyclohexane and 0.0475 g. of t-butyl nitrite. This was exposed directly to the ultraviolet lamp as in Example 9 but only for 20 minutes. After the t-butyl nitrite was used up, analysis of the reactor contents showed yields of 9% nitrosocyclohexane dimer and 38% cyclohexanone oxime based on t-butyl nitrite. Thus, the total potential yield of oxime was 47%.

Although the present invention has been described with preferred embodiments, it is to be understood that modifications and variations may be resorted to, without departing from the spirit and scope of this invention, as those skilled in the art will readily understand. Such variations and modifiications are considered to be within the purview and scope of the appended claims.

What is claimed is:

1. A process for forming a ketoxime of a cycloalkane by means of a photochemical reaction between a cycloalkane having 5 to 12 carbon atoms in the ring portion thereof and an alkyl nitrite having 1 to 5 carbon atoms in the alkyl group, that comprises forming a mixture consisting essentially of said reactants in which the molar

TABLE II

| | Room temperature | | | 80° C. | | |
|---|---|---|---|---|---|---|
| | No additive | With 12.3% pyridine | With 9% MeOH | No additive | With 12.3% pyridine | With 9% MeOH |
| Example No. | 4 | 5 | (¹) | 6 | 7 | 8 |
| Percent conversion of nitrite to oxime plus dimer | 58 | 58 | -------- | 37 | 41 | 41 |
| Percent of total present as oxime | 24 | 43 | -------- | 53 | 98 | 100 |
| Percent conversion of nitrite to nitrogen gas | 35 | 22 | -------- | 42 | 22 | 26 |

¹ Not miscible.

The data in Table II show that, at either room temperature or 80° C., the overall conversion is not affected by the pyridine or methyl alcohol, but the amount present as oxime is increased and the conversion of nitrite to nitrogen gas is decreased. At 80° C., the total conversion to "oxime" plus "dimer" is decreased, but the proportion going to oxime is increased. With additives present at the amount of the cycloalkane exceeds that of the alkyl nitrite, adjusting the temperature and pressure of said mixture so that the reactants are in the liquid phase, photolyzing said reactants by exposing them to radiation of a wave length of 1000 to 400 Angstrom units to form a nitrosocycloalkane, and rearranging the latter compound to said ketoxime.

2. The process defined in claim 1, wherein the temperature at which said reaction is carried out is in the range of 0° to 125° C.

3. The process defined in claim 2, wherein said nitrosocycloalkane is rearranged in the presence of a catalyst.

4. The process defined in claim 2, wherein said nitrosocycloalkane is rearranged in situ during the photolysis reaction.

5. The process defined in claim 2, wherein said nitrosocycloalkane is rearranged in situ during the photolysis reaction in the presence of a polar compound catalyst selected from the group consisting of lower alcohols and pyridine.

6. The process defined in claim 1, wherein the concentration of alkyl nitrite is 0.001 to 0.1 mole per mole of cycloalkane.

7. The process defined in claim 1, wherein said nitrosocycloalkane is rearranged in the presence of a catalyst.

8. The process defined in claim 1, wherein said nitrosocycloalkane is rearranged in situ during the photolysis reaction.

9. The process defined in claim 1, wherein said nitrosocycloalkane is rearranged in situ during the photolysis reaction in the presence of a polar compound catalyst selected from the group consisting of lower alcohols and pyridine.

10. The process defined in claim 1, wherein said cycloalkane is cyclohexane, said ketoxime is cyclohexanone oxime, and said alkyl nitrite is methyl nitrite.

References Cited

UNITED STATES PATENTS

| | | | |
|---|---|---|---|
| 3,047,482 | 7/1962 | Cheng et al. | 204—162 |
| 3,048,634 | 8/1962 | Mueller et al. | 260—566 |
| 3,141,839 | 7/1964 | Metzger et al. | 204—162 |

HOWARD S. WILLIAMS, Primary Examiner

PO-1050
(5/69)

UNITED STATES PATENT OFFICE
CERTIFICATE OF CORRECTION

Patent No. 3,459,648      Dated August 15, 1969

Inventor(s) JOHN P. GUARINO & ROBERT H. WILLIAMS

It is certified that error appears in the above-identified patent and that said Letters Patent are hereby corrected as shown below:

Column 2, line 28      for "1000 to 2000"
                                    read --1000 or 2000--

Column 3, line 75      for "$5 \times 16^{-6}$ mm."
                                    read --$5 \times 10^{-6}$ mm.--

Column 6, Claim 1
         line 73      for "400"
                                read --4000--

SIGNED AND
SEALED
DEC 15 1970

(SEAL)
Attest:

Edward M. Fletcher, Jr.
Attesting Officer

WILLIAM E. SCHUYLER, JR.
Commissioner of Patents